United States Patent [19]

Leake et al.

[11] Patent Number: 4,912,209

[45] Date of Patent: Mar. 27, 1990

[54] STARCH BASED CORRUGATING ADHESIVES

[75] Inventors: Craig Leake, Edison; Michael Foran, Somerville; Jeffrey G. Atkinson, Neshanic Station, all of N.J.

[73] Assignee: National Starch and Chemical Corporation, Bridgewater, N.J.

[21] Appl. No.: 207,350

[22] Filed: Jun. 15, 1988

[51] Int. Cl.⁴ .......................... C08B 31/00; C08J 3/02; C09D 3/20; C09J 3/16

[52] U.S. Cl. .................................... 536/102; 106/213; 156/336

[58] Field of Search ................ 106/213; 156/328, 336; 536/102

[56] References Cited

U.S. PATENT DOCUMENTS

| | | | |
|---|---|---|---|
| 2,051,021 | 8/1936 | Bauer | 244/45 R |
| 2,102,937 | 12/1937 | Bauer | 106/213 |
| 3,019,120 | 1/1962 | Bauer et al. | 106/213 |
| 3,359,223 | 12/1967 | Nakamura et al. | 524/48 |
| 3,836,376 | 9/1974 | Hampton et al. | 106/213 |
| 3,912,531 | 10/1975 | Musselman et al. | 106/213 |
| 4,018,953 | 4/1977 | Demko et al. | 428/182 |
| 4,359,341 | 11/1982 | Allen | 106/213 |
| 4,366,275 | 12/1982 | Silano et al. | 524/47 |
| 4,400,480 | 8/1983 | Silano et al. | 524/47 |
| 4,424,921 | 1/1984 | Leake et al. | 524/47 |
| 4,568,714 | 2/1986 | Overholt | 524/25 |
| 4,787,937 | 11/1988 | Leake | 156/336 |

Primary Examiner—John Kight
Assistant Examiner—C. Azpuru
Attorney, Agent, or Firm—Royal N. Ronning, Jr.; Edwin M. Szala

[57] ABSTRACT

This invention presents starch-based alkaline corrugating adhesives having improved green bond strength due to the use of undried starch as the raw starch component in the adhesive. Such adhesives can be used in corrugation processes at much higher corrugator running speeds than the conventionally employed adhesives.

9 Claims, No Drawings

STARCH BASED CORRUGATING ADHESIVES

BACKGROUND OF THE INVENTION

The procedures employed in the production of corrugated paperboard generally involve a continuous process wherein one strip of paperboard is fluted by means of heated, fluted rollers. The protruding tips on one side of this fluted paperboard strip are then coated with an adhesive, and a flat sheet of paperboard, commonly referred to in the trade as a facing, is brought into contact with these adhesive-coated tips. By applying heat and pressure, an adhesive bond is formed there between. This process produces what is known as single-feed board, named for the fact that the facing is applied to only one surface. If a double-faced paperboard (in which an inner fluted layer is sandwiched between two facings) is needed, a subsequent operation is formed wherein the adhesive is applied to the exposed tips of the single-faced board and the adhesive-coated tips are then joined with a second facing under pressure and heat. Thus, both single and double-faced board can be produced in a continuous process. The typical use of these types of adhesives in a corrugating process and the use and operation of corrugators in general are described in U.S. Pat. Nos. 2,102,937 and 2,051,025 to Bauer.

A major concern in such processes is the selection of the appropriate adhesive, as its properties will affect not both only the strength and stability of the final corrugated product, but also the parameters (corrugator speed, etc.) within which the process can be operated. Thus, such adhesives are chosen in light of the specific requirements of the process and the properties desired in the ultimate corrugated paperboard. The adhesives most commonly used in corrugating are starch-based adhesives which are popular because of their desirable adhesive properties, low cost, and ease of preparation.

The most common type of starch-based corrugating adhesives comprises the alkaline adhesives. Such adhesives are comprised of dried raw, ungelatinized starch suspended in an aqueous dispersion of gelatinized (cooked) starch termed the carrier. These adhesives are produced by gelatinizing starch in water with sodium hydroxide (caustic soda) to yield a gelatinized (or cooked) carrier which is then blended or mixed with the raw (ungelatinized) starch, borax and water to produce the adhesive.

In the corrugating process, the adhesive is applied (usually at a temperature between 25° and 55° C.) directly to the tips of the fluted paper medium and the facing is brought into contact with the adhesive-coated surfaces; the subsequent application of heat causes the raw starch to gelatinize, resulting in an instantaneous increase in viscosity and tack, thereby forming of the adhesive bond between the fluted paper and the facing.

For various applications, the adhesive composition can be varied to maximize one or more desirable properties such as extended pot life and viscosity stability, water resistance of the ultimate bond, etc. However, one property directly related to the utility of the formulation as a corrugating adhesive is its ability to rapidly form an initial bond (termed "tack" or "green bond strength"); this rate of tack development is directly related to the speed at which the corrugator can be run. There exists a need for corrugating adhesives possessing high green bond strengths and rapid development of tack.

While there are different theories regarding the respective roles of the raw starch and the carrier in the development of adhesive properties, some research has centered on the view that the carrier contributes to the bond strength and setting speed of the adhesive; indeed, it has been suggested that good tack in the carrier leads to good tack (and therefore improved runnability) in the adhesive (see e.g., R. Williams, C. Leake and M. Silano, TAPPI, Vol. 60, No. 4 April/1977 pp 86–89). Further, it has been known for many years that a corrugating adhesive whose carrier portion is prepared from a high amylose starch exhibits superior tack to one prepared from pearl starch, which contains about 27% amylose, because the high amylose carrier will have improved rheological and film-forming properties, and increased moisture resistance. Thus, there are many different carriers available for use in starch based adhesives.

To date, however, relatively little experimentation has been done with the raw (uncooked or ungelatinized) starch portion of the adhesive, other than varying the species of starch source utilized. Generally, the raw starch is applied in dried powder form, and is used as such in the adhesive preparation. Thus, during commercial processing the starch is ordinarily dried in an elevated temperature dryer (generally at 200°–250° F., 94°–112° C.) (to remove water to about 8–14% moisture content), after which it is packaged and stored until use.

SUMMARY OF THE INVENTION

It is an object of this invention to present a starch-based alkaline adhesive for use in corrugation processes. It is further an object of this invention to present a starch-based alkaline corrupting adhesive which exhibits a high green strength such that it can be employed in high speed corrugating processes.

This invention presents a series of starch-based alkaline corrugating adhesives which fulfill these objects. The basic components of these adhesives comprise an aqueous dispersion of a gelatinized (or cooked) starch and an "undried" raw starch (as used herein "undried" starch shall be inclusive of aqueous starch dispersions, such as undried starch milk, which have never been dried, and starches which have been dewatered and/or air-dried at ambient temperature, nominally 60°–80° F.). The use of undried raw starch, it has been found greatly increases the green bound strength and rate of tack development of the resultant adhesives as compared with the same adhesives prepared with standard (commercially dried) raw starch. Further, this increase is observed with high amylose carriers, other carriers such as corn starch, and blends of starch and synthetic polymers such as those disclosed in U.S. Pat. No. 4,424,291 to Leake et al., incorporated herein by reference.

The adhesive also comprise the other standard components of starch-based corrugating adhesives, namely an alkali (such as sodium hydroxide) and borax. The undried raw starch, carrier, alkali, borax, and water are generally present in amounts of about 15 to 35% (dry basis, db), about 2 to 6% (db), 0.2 to 0.9% (db) , about 0.1 to 0.8 (db), and 60 to 80%, respectively by weight based on the total adhesive composition.

Further, the adhesives can be used at a variety of starch solids contents, generally 20–40% on a "dry basis" (d.b.) of the total composition. This permits a wide degree of latitutde in the potential applications in which the adhesives can be employed. While general experience has indicated that in industry, most corrugators are using corrugating adhesives containing from about 18–26% (d.b.) by weight of total solids, there are certain applications in which higher % solids would be desirable. The adhesives of this invention, thus, permit employment in a wide array of applications.

DETAILED DESCRIPTION OF THE INVENTION

The raw starch component of the corrugating adhesives of this invention can be any starch suitable for use in corrugating adhesives. Preferred starches are corn, tapioca, wheat, potato, and mixtures thereof, with corn and tapioca starches being the most preferred. Mixtures of these starches and other starches are also useful, with the sole criterion for use being the requirement that the raw starches be undried.

Typical forms of undried starches include starch milks (aqueous dispersions of raw starches) and starches air dried at ambient temperature (60°–80° F.); such starches also include dewatered starches, i.e., starches which are filtered from aqueous dispersion by gravity or vacuum filtration. In fact, it appears that the primary criterion for such "undried" starches is that they not be subjected to the elevated temperatures realized during commercial starch drying processes.

While not wishing to be bound by theory, applicants postulate that high temperature drying of starches adversely affects the starch, rendering it less capable of developing tack rapidly. By eliminating such a drying step, the raw starch presumably remains in a much more reactive form, and the resultant adhesive has a much higher green bond strength and rate of tack development.

While it is to be understood that the undried starches can be employed as the raw starch in any starch-based adhesive, and that use of such starches will greatly improve the green bond strength and rate of tack development in these adhesives, typically such adhesives will comprise a raw starch and a cooked starch carrier. While the use of a high amylose starch carrier is not essential for the purposes of this invention, use of such a carrier is preferred since it, too, will aid in increasing green bond strength. Thus, while the use of an undried raw starch component will increase the tack regardless of the carrier employed, the use of a high amylose carrier, generally 35–70% (by weight) amylose, will result in faster bond development. In circumstances where the use of a high amylose carrier may be undesirable or inconvenient, other carriers, such as ordinary corn starch, may be employed.

The ratio of raw starch/carrier will vary as the molecular weight of the carrier varies, with lower amounts of high molecular weight carriers being required to achieve the same results. In general, however, the ratio ranges from about 4/1 to about 16/1, by weight, depending on the nature of the starch and the viscosity desired.

The alkali (base) employed in the adhesive is preferably caustic soda, (sodium hydroxide); however, other bases may be employed in partial or full replacement of the sodium hydroxide as the particular application dictates. Such bases include, for example, alkali metal hydroxides such as potassium hydroxide, alkaline earth hydroxides such as calcium hydroxide, alkaline earth oxides such as barium oxide, alkali metal carbonates such as sodium carbonate, and alkali metal silicates such as sodium silicate. The alkali may be employed in aqueous or solid form. The alkali is generally present in a concentration of about 0.2 to 0.9 (db) by weight, of the adhesive.

The starch based alkaline corrugating adhesives also contain borax, in a concentration of about 0.1 to about 1% (by wt.) of the adhesive as the last essential component.

In addition to the essential ingredients of the adhesive composition of this invention, any conventional non-chemically functional additives may be incorporated into the adhesive in minor amounts, if desired. Such additives include, for example, wetting agents, proteins, placticizers, solubilizing agents, rheology modifiers, water conditioners, penetration control agents, peptizers such as urea, gelatinization temperature modifiers, inert fillers such as clay and finely ground polymers, thickeners such as inorganic colloidal clay, guar, hydroxyethyl cellulose, alginates, polyvinyl alcohol, polymers of ethylene oxide and the like, wet strength resins and emulsions such as polyvinyl acetate.

The corrugating adhesives of this invention can be prepared by any standard method so long as elevated temperature drying of the raw starch is not required. In a preferred mthod, the carier starch is first gelatinized (cooked) in a portion of the water with the alkali to provide the carrier component of the adhesive. The raw starch slurry is prepared by mixing the undried raw starch, borax and remaining water. The carrier and raw starch mixture are then combined to form the final adhesive. Optional ingredients, if desired, can be added at any convenient point during the preparation of either component but are usually added to the finished adhesive.

The adhesive thus obtained can be used to bond single or double-faced boards using any equipment which is presently employed for the preparation of corrugated board. In general, the adhesive is maintained at a temperature preferably between 25° and 55° C. before its application to the protruding tips of the fluted paper strip. The actual application may be accomplished by the use of glue rollers which are ordinarily employed in most corrugating machines, or one may utilize other application methods which may be able to achieve a different distribution of adhesive. Following the application of the adhesive of the fluted paper strip, the latter is then brought into immediate contact with the facing bond under the influence of heat and pressure, as is well known in the art. A double-faced board may be subsequently prepared by bringing a second facing in contact with the open fluted surface of the single-faced board by the usual procedures.

Since the adhesives develop tack at an accelerated rate, the corrugator speed can be proportionally increased over the speeds used with conventional adhesives. This permits a more rapid and efficient production of the corrugated board. In addition, it is contemplated that the corrugating adhesives can be used in other applications, such as lamination and dual arch lamination, where bonding occurs in the presence of heat, and rapid green bond formation is desirable.

EXAMPLES

The examples which follow illustrate specific embodiments of the invention. In the examples all parts and percentages are given by weight and all temperatures in degrees Fahrenheit or degrees Celsius as noted.

PROCEDURE

In each example, the sample adhesives were examined for tack development and (green bond strength) in the joining of a (62 lb/MSF wet strength) corrugating liner to a (33 lb/MSF wet strength) corrugating medium.

The adhesive was applied to the corrugating liner using a (10 mil) Bird applicator. Subsequently, a sheet of corrugating medium was placed on top of the adhesive and the system was placed atop a hot plate at 350° F. (177° C.) under a 5 g/cm² weight for 5 seconds. Immediately thereafter, one end of the liner was attached to a dial-type spring scale. The medium was then manually separated from the liner in a continuous fashion and the force required to achieve such separation was periodically recorded; this force is a measure of the green bond strength and the rate of tack development with time, and is related to the speed at which a corrugator can be run (i.e. the higher the green bond strength and the faster tack is developed, the faster the corrugator can be run).

EXAMPLE 1

Preparation of Adhesive

All samples of corrugating adhesives were prepared in essentially the same manner, differing only in the precise starches employed and the ratios of components. A representative preparation is presented below.

A carrier component was prepared by cooking at 150° F. (66° C.) 26 g (d.b.) of a corn starch in 179 g. of water. A total of 5.2 gm of sodium hydroxide (dissolved in 15.7 gm water) was then added and the system was agitated for 20 minutes. Then, 52 gm of water was added to cool the system and quench the reaction. In a separate vessel, 164 g. (d.b.) of corn starch was added to 429.3 g. of waer at 110° F. (43° C.) followed by the addition of 3.2 g. of borax (pentahydrate) to provide the raw starch slurry. After 5 minutes of moderate agitation, the carrier starch was slowly added to the raw starch slurry and moderate agitation was continued resulting in an adhesive having a total solids content of 22.7% (starch solids 21.7%).

EXAMPLE 2

Comparison of Commercially Dried vs Air-dried Raw Starch

Two adhesives, designated A and B, were prepared using the procedure of Example 1, differing only in that sample A contained a commercially dried corn starch, as the raw starch component, while sample B contained a undried raw corn starch which was prepared by filtering and air drying an undried starch slurry at ambient temperature. Both adhesive possessed gelatinization temperatures of 149° F. (66° C.) and the following Brookfield viscosities and Stein-Hall values at 100° F. (38° C.):

| Adhesive | Stein Hall | Brookfield Viscosity | |
|---|---|---|---|
| | | 20 rpm | 100 rpm |
| A | 35 sec | 326 cp | 280 cp |
| B | 32 sec | 338 cp | 300 cp |

Both samples were examined for tack development as described supra. In a series of four replicate trials, the following average results were obtained.

| Adhesive | Force Required to Achieve Separation (g) | | | |
|---|---|---|---|---|
| | 5 sec | 10 sec | 15 sec | 20 sec |
| A | 250 | 300 | 400 | 500* |
| B | 350 | 400 | 500* | |

*Maximum of scale

It can be seen that, Adhesive B prepared from the air dried corn starch, developed tack at a more rapid rate than Adhesive A, prepared with commercially dried corn starch.

EXAMPLE 3

Effect of Increased Starch Content

To assess the effects of increasing starch content on adhesive behavior, two samples designated C and D, were prepared nominally following the procedure in Example 1, but using the following formulation.

| Carrier | |
|---|---|
| Water | 178.8 g |
| Corn starch (anhydrous) | 26.1 g |
| Caustic 25% Sol'n | 22.0 g |
| Raw | |
| Water | 422.9 g |
| Cornstarch | 202.8 g |
| Borax | 3.5 g |

The resultant adhesives had a solids content of 26.2% (25.2% starch solids).

As in Example 2, the adhesives differed only in the raw starch employed, adhesive C contained standard (commercially) dried corn starch, D contained air-dried corn starch. The physical properties of each formulation are summerized below.

| Adhesive | Stein Hall (sec) at 100° F. (38° C.) | Brookfield Visc. (cp) at 100° F. (38° C.) | | Gelatinization Temp. |
|---|---|---|---|---|
| | | 20 RPM | 100 RPM | |
| C | 61 | 610 | 690 | 150° F. (67° C.) |
| D | 54 | 550 | 520 | 151° F. (67° C.) |

The samples were assayed for tack development in four replicate trials. The average of these trials is presented below.

| Adhesive | Force Required to Achieve Separation (g) | | | |
|---|---|---|---|---|
| | 5 sec | 10 sec | 15 sec | 20 sec |
| C | 325 | 400 | 500 | 600 |
| D | 450 | 500 | 600 | 800 |

As in Example 2, the adhesive employing the air dried raw starch (D) developed tack at a much more rapid rate than the adhesive employing its commercially dried counterpart (C).

EXAMPLE 4

Effect of Increased Starch Content

To further assess the effect of increased starch content on adhesive behavior, two samples designated E and F were prepared following the procedure in Example 1, but using the following formulation.

| Carrier | |
|---|---|
| Water | 157.7 g |
| Corn Starch (Anhydrous) | 18.9 g |
| NaOH | 1.5 g |
| dissolved in Water | 10.5 g |
| Quench Water | 52.5 g |
| Raw | |
| Water | 346.9 |
| Corn Starch | 302.4 |
| Borax | 4.0 |

The resultant adhesive had a solids content of 36.5% (35.9% starch solids).

As in Example 3, the adhesives differed only in the raw starch employed, Adhesive E contained commercially dried cornstarch, F contained air dried cornstarch.

The samples were assayed for tack development in four replicate trials. The average of these trials is presented below.

| | Force Required to Achieve Separation (g) | | | |
|---|---|---|---|---|
| Adhesive | 5 sec | 10 sec | 15 sec | 20 sec |
| E | 600 | 1050 | 1400 | FT |
| F | 1000 | 1400 | 2000* | |

*Maximum on scale

As in the previous examples the adhesive employing air dried raw starch (F) developed tack at a much more rapid rate than the adhesive employing its commercially dried counterpart (E).

EXAMPLE 5

Use of Slurried Starch Milk

To assess the effects of the use of (undried) slurried starch milk in adhesives, samples G-K were prepared nominally following the procedure of Example 1 with the exception that the carrier was cooked at 110° F. (43° C.) rather than 150° F.) and using the following basic formulation:

| Carrier | |
|---|---|
| High Amylose Starch* | 30.1 g |
| Water | 160.1 g |
| Caustic | 5.1 g |

| Raw | |
|---|---|
| Water | 361.2 g |
| Starch | 239.8 g |
| Borax | 3.2 g |
| Total Solids 34.8% (Total Starch Solids 33.8%) | |

*Contained approxately 70% (by wt. db) amylose, 30% (by wt. db) amylopectin

Samples G and K employed undried slurried corn starch milk as the raw starch, sample H employed a standard (commercially) dried corn starch, and samples I and J employed air-dried starch which was subsequently dried in the laboratory at elevated temperatures (160°-180° F. and 320°-350° F. respectively).

The physical properties of each formulation and the results of the tack development tests are presented below:

| | Stein Hall at 100° F. (38° C.) | Brookfield Visc. (cp) at 100° F. (38° C.) | | Gelatinization | Force required to Achieve Separation (g) | | |
|---|---|---|---|---|---|---|---|
| Adhesive | (sec) | 20 RPM | 100 RPM | Temp. | 5 sec. | 10 sec. | 15 sec. |
| G | 32 | 1256 | 742 | 141° F. (61.5° C.) | 1200 | 2000[a] | — |
| H | 24 | 750 | 440 | 139° F. (60.5° C.) | 800 | 1200 | 2000 (13.5 sec) |
| I | 23 | 684 | 432 | 139° F. (60.5° C.) | 800 | 1400 | FT[b] (14 sec) |
| J | 23 | 554 | 352 | 141° F. (61.5° C.) | 800 | 1000 | 1400 (FT) |
| K | 23 | 1176 | 708 | 140° F. (61.5° C.) | 1150 | 2000[a] (8 sec) | — |

[a]Maximum value on scale
[b]Fiber tear

Again, the data demonstrate that the adhesives which employ the undried starch (G and K) develop tack much faster than the heat dried ones (H-J), including the air-dried samples which were subsequently heat dried (I, J).

EXAMPLE 6

Use of Tapioca Starch

To assess the effects of using dried and undried tapioca starch in place of corn starch as the raw starch component of the adhesive, samples L-N were prepared following the procedure of Example 5, and the following basic formulation.

| Carrier | |
|---|---|
| High Amylose Starch (see Ex. 5) | 30.1 gm |
| Water | 160.1 gm |
| Caustic | 5.1 g |
| Raw | |
| Water | 361.2 g |
| Staren | 239.8 g |
| Borax | 3.2 g |
| Total Solids 34.8% (Total Starch Solids 33.8%) | |

Sample L was prepared using heat (commercially) dried tapioca raw starch while M and N employed air-dried tapioca. The physical properties of the adhesives and the results of the tack development determinations are presented below.

| | Stein Hall at 100° F. | Brookfield Visc. (cp) at 100° F. | | Gellation | Force required to Achieve Separation (gm) | |
|---|---|---|---|---|---|---|
| Adhesive | (sec) | 20 RPM | 100 RPM | Temp. | 5 sec. | 10 sec. |
| L | 34 | 1668 | 1006 | 141° F. (61.5° C.) | 1200 | 2000* |
| M | 28 | 1082 | 666 | 142° F. (62° C.) | 2000* | — |
| N | 36 | 1664 | 1084 | 139° F. (60.5° C.) | 2000* | — |

*Maximum on scale

The results demonstrate that while all three tapioca starch-based adhesives developed tack at a rapid rate, the adhesives employing the air dried starch developed it at a more rapid rate.

It is apparent that many modifications and variations of this invention as hereinabove set forth may be made without departing from the spirit and scope thereof. The specific embodiments described are given by way of example only and the invention is limited only by the terms of the appended claims.

What is claimed is:

1. An improved starch-based alkaline corrugating adhesive comprising an aqueous dispersion of a gelatinized carrier starch and a raw starch wherein the improvement comprises employing an undried starch as the raw starch.

2. The adhesive of claim 1, wherein the adhesive contains about 0.2 to about 0.9% (by wt. d.b.) of alkali and about 0.1 to about 0.8% (by wt., d.b.) of borax, wherein the percentages are based on the total weight of the adhesive.

3. The adhesive of claim 2, wherein the water content ranges from about 60° to about 80% (by wt.) based on the total weight of the mixture.

4. The adhesive of claim 2, wherein the ratio of raw starch/carrier starch ranges from about 4/1 to about 16/1 by weight.

5. The adhesive of claim 2 wherein the alkali is sodium hydroxide.

6. The adhesive of claim 2, wherein the raw starch is selected from the group consisting of undried corn starch, undried tapioca, undried wheat starch, undried potato starch, and mixtures thereof.

7. The adhesive of claim 6, wherein the raw starch is an undried starch milk.

8. The adhesive of claim 6, wherein the raw starch is air-dried at ambient temperature.

9. The adhesive of claim 2, wherein the total solids content is 20 to 40%, by weight, based on the total weight of the mixture.

* * * * *